(12) United States Patent
Kang

(10) Patent No.: US 11,205,278 B2
(45) Date of Patent: Dec. 21, 2021

(54) DEPTH IMAGE PROCESSING METHOD AND APPARATUS, AND ELECTRONIC DEVICE

(71) Applicant: GUANGDONG OPPO MOBILE TELECOMMUNICATIONS CORP., LTD., Guangdong (CN)

(72) Inventor: Jian Kang, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 15/931,041

(22) Filed: May 13, 2020

(65) Prior Publication Data
US 2021/0012516 A1 Jan. 14, 2021

(30) Foreign Application Priority Data
Jul. 11, 2019 (CN) .......................... 201910623071.X

(51) Int. Cl.
*G06T 7/521* (2017.01)
*G06T 7/194* (2017.01)
*G06K 9/32* (2006.01)

(52) U.S. Cl.
CPC ............ *G06T 7/521* (2017.01); *G06K 9/3233* (2013.01); *G06T 7/194* (2017.01); *G06T 2207/10028* (2013.01)

(58) Field of Classification Search
CPC ...................... G06T 7/521; G06T 7/194; G06T 2207/10028; G06K 9/3233
See application file for complete search history.

(56) References Cited

U.S. PATENT DOCUMENTS

| | | | |
|---|---|---|---|
| 8,885,890 B2* | 11/2014 | Tardif | G06T 5/002 382/106 |
| 9,384,556 B2* | 7/2016 | Mazurenko | G06T 7/11 |
| 10,070,041 B2* | 9/2018 | Park | H04N 13/271 |
| 10,097,793 B2* | 10/2018 | Eldar | G06T 7/50 |
| 10,362,296 B2* | 7/2019 | Price | H04N 13/111 |
| 10,453,249 B2* | 10/2019 | Smirnov | G06T 5/001 |
| 10,547,824 B2* | 1/2020 | Tanaka | G01C 3/085 |
| 10,643,336 B2* | 5/2020 | Usikov | G06T 7/12 |

(Continued)

FOREIGN PATENT DOCUMENTS

| | | |
|---|---|---|
| CN | 102184531 A | 9/2011 |
| CN | 102271254 A | 12/2011 |

(Continued)

OTHER PUBLICATIONS

Extended European Search Report for EP application 20180892.0 dated Nov. 9, 2020.

(Continued)

*Primary Examiner* — Gregory M Desire
(74) *Attorney, Agent, or Firm* — Young Basile Hanlon & MacFarlane, P.C.

(57) ABSTRACT

The present disclosure provides a depth image processing method and apparatus, and an electronic device. The method includes: acquiring a first image acquired by a depth sensor and a second image acquired by an image sensor; determining a scene type according to the first image and the second image; and performing a filtering process on the first image according to the scene type.

16 Claims, 4 Drawing Sheets

(56) References Cited

U.S. PATENT DOCUMENTS

| | | | |
|---|---|---|---|
| 10,755,426 B2 * | 8/2020 | Jouppi | .................. G06T 5/005 |
| 2012/0087572 A1 | 4/2012 | Dedeoglu et al. | |
| 2013/0148853 A1 | 6/2013 | Hwang et al. | |
| 2013/0308005 A1 | 11/2013 | Takahashi | |
| 2017/0178305 A1 | 6/2017 | Silver et al. | |
| 2017/0337665 A1 | 11/2017 | Chaouch | |
| 2018/0293745 A1 | 10/2018 | Ha et al. | |

FOREIGN PATENT DOCUMENTS

| | | | |
|---|---|---|---|
| CN | 102714741 A | 10/2012 |
| CN | 102867288 A | 1/2013 |
| CN | 102883170 A | 1/2013 |
| CN | 106662651 A | 5/2017 |
| CN | 108564620 A | 9/2018 |
| CN | 108764370 A | 11/2018 |
| CN | 109615596 A | 4/2019 |
| CN | 109767467 A | 5/2019 |
| CN | 109819238 A | 5/2019 |
| CN | 110378945 A | 10/2019 |
| CN | 110378946 A | 10/2019 |
| CN | 110400342 A | 11/2019 |

OTHER PUBLICATIONS

ISR for PCT application PCTCN2020096620 dated Sep. 22, 2020.
China Office Action with English Translation for CN Application 201910623071.X dated Mar. 17, 2021.
Three-Dimensional Imaging of Morphological Changes of Potato Slices During Drying; vol. 35; No. 1; Jan. 2019; 7 pages with English Translation.

* cited by examiner

DEPTH IMAGE PROCESSING METHOD AND APPARATUS, AND ELECTRONIC DEVICE

CROSS-REFERENCE TO RELATED APPLICATION(S)

This application claims priority to and the benefit of Chinese Patent Application Serial No. 201910623071.X, filed on Jul. 11, 2019, the entire disclosure of which is hereby incorporated by reference.

TECHNICAL FIELD

The present disclosure relates to an image processing technology field, and more particularly, to a depth image processing method and apparatus, and an electronic device.

BACKGROUND

Currently, in order to improve a quality of a depth image, the depth image may be subjected to filtering process. General filtering algorithms such as bilateral filtering, anisotropic filtering, and filtering based on a fixed threshold have been adopted to perform filtering process on the depth image.

However, there are often many uncertainties in practical application scenarios, such as different ambient lighting, different distances between a background and a foreground to a time of flight (TOF) camera, and thus reasonable parameter settings are required for specific scenarios when using the above filtering algorithms. In this way, this setting can be difficult for users who have no relevant professional experience or application developers who only use depth images, which may cause more fly pixel points in the filtered depth image, thereby affecting subsequent image processing.

SUMMARY

Embodiments of the present disclosure seek to solve at least one of the problems existing in the related art to at least some extent.

In a first aspect, embodiments of the present disclosure provide a depth image processing method. The method includes acquiring a first image acquired by a depth sensor and a second image acquired by an image sensor; determining a scene type according to the first image and the second image; and performing a filtering process on the first image according to the scene type.

In a second aspect, embodiments of the present disclosure provide a depth image processing apparatus. The apparatus includes a processor and a memory. The memory is configured to store instructions executable by the processor. The processor is configured to run a program corresponding to the instructions by reading the instructions stored in the memory, so as to implement the depth image processing method in the first aspect.

In a third aspect, embodiments of the present disclosure provide an electronic device. The electronic device includes a depth sensor, an image sensor, and a processor. The depth sensor is configured to acquire a first image. The image sensor is configured to acquire a second image synchronously with the first image. The processor is configured to acquire the second image and the first image, and implement the depth image processing method in the first aspect.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

The above and/or additional aspects and advantages of embodiments of the present disclosure will become apparent and more readily appreciated from the following descriptions made with reference to the drawings.

DETAILED DESCRIPTION

Figure 1:
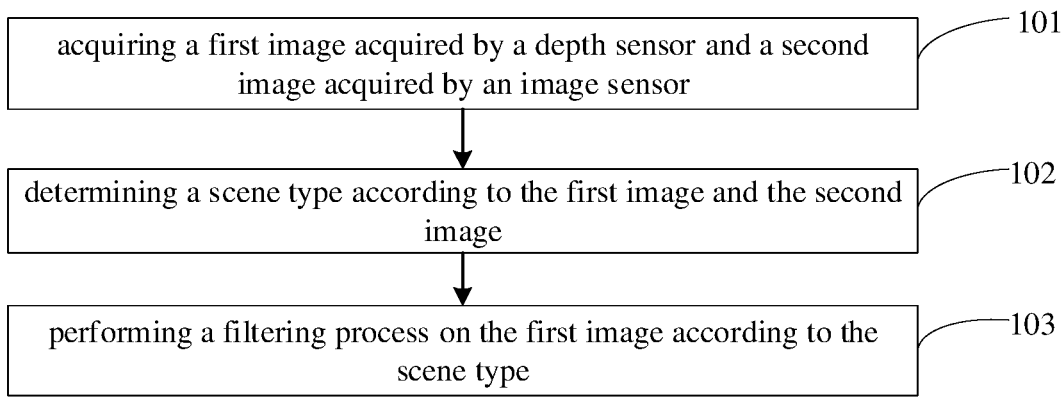
FIG. 1 is a flowchart of a depth image processing method according to Embodiment 1 of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

Currently, a processing scheme for raw data of a single-frequency TOF camera often includes the following.

First, raw data is converted into i, q data, where i, q represent collected charges, which are sine and cosine values of delay phase shift angle corresponding to distance respectively.

Then, i, q are converted into confidence coefficient p0 (|i|+|q|) and phase difference c0 (arctan (i/q)). Error correction is performed on the confidence coefficient p0 to obtain p_cor.

i, q are determined according to p_cor and c0, and filtered, and the filtered radial is converted into a point cloud depth image. i and q are often filtered independently according to the following steps:

First, the overall depth values of the depth image are smoothed by smoothing the corresponding i and q values, in which the smoothing filtering adopts general filtering algorithms such as anisotropic filtering and median filtering.

Second, i, q are converted into depth information and confidence coefficient information.

Lastly, general filtering (including time and space filtering) is performed on the generated depth, in which the general algorithms adopted may include bilateral filtering, anisotropic filtering, fly pixel/confidence coefficient threshold filtering, which may improve the quality of the output depth image to some extent.

However, reasonable parameter settings are required for specific scenarios when using the above filtering algorithms, such as for different ambient lighting, different distances between a foreground to a time of flight (TOF) camera, different distances between a background and a foreground, and the like. Reasonable parameter settings are made for specific scenarios in the related art. This can be difficult for users who have no relevant professional experience or application developers who only use depth images, which may cause more fly pixel points in the filtered depth image, thereby affecting subsequent image processing.

The present disclosure provides a depth image processing method, for the purpose of solving the problem of non-ideal filtering effect caused by manually setting filtering parameters when performing filtering processing on a depth image under different scene types in the related art.

With the depth image processing method according to embodiments of the present disclosure, the depth image acquired by the depth sensor and the image acquired by the image sensor are acquired, the scene type is determined according to the depth image and the image acquired by the image sensor, and filtering process is performed on the depth image according to the scene type. Therefore, filtering process can be performed adaptively on the depth image by selecting a filtering mode according to different scene type, thereby effectively removing abnormal points in the depth image, such as fly pixel points, which improves the smoothness of the depth image.

A depth image processing method, an apparatus, and an electronic device according to the embodiments of the present disclosure are described below with reference to the drawings.

FIG. 1 is a flowchart of a depth image processing method according to Embodiment 1 of the present disclosure.

For example, in embodiments of the present disclosure, the depth image processing method is configured in a depth image processing apparatus, and the depth image processing apparatus may be applied for any electronic device with a photographing function, so that the electronic device performs the depth image processing function.

The electronic device may be a mobile terminal or a smart camera, which is not limited herein. The mobile terminal may be a hardware device such as a mobile phone, a tablet computer, a personal digital assistant, or a wearable device, which has at least one of an operating system, a touch screen, or a display screen.

As illustrated in FIG. 1, the depth image processing method includes the following steps.

At step 101, a first image acquired by a depth sensor and a second image acquired by an image sensor are acquired.

In embodiments of the present disclosure, the electronic device may include a depth sensor and an image sensor, and a depth image is acquired through the depth sensor, and each pixel unit in the acquired first image (depth image) has a corresponding depth and a confidence coefficient of the depth.

In some implementations, the depth sensor may be a TOF camera. The TOF camera may include an infrared light source through which a light signal is emitted outwardly, and a photosensitive module configured to receive reflected light signal, so that distance measurement may be performed according to a phase change of the emitted light signal and the reflected light signal to obtain depth information.

In other words, the depth corresponding to each pixel unit is generated based on the phase difference of infrared light, and the confidence coefficient of the depth is determined based on the light intensity of the infrared light. The closer the distance to the TOF camera is, the smaller the depth is, and the larger the confidence coefficient of the depth is. The farther the distance to the TOF camera is, the larger the depth is, and the smaller the confidence coefficient of the depth is.

In embodiments of the present disclosure, the second image is two-dimensional, and may be acquired by an image sensor of the electronic device. For example, the electronic device may include an RGB camera, and the second image is acquired through the RGB camera.

It should be noted that the second image and the first image are acquired synchronously, for example, the RGB sensor and the depth sensor of the electronic device are configured to acquire the second image and the first image synchronously.

At step 102, a scene type is determined according to the first image and the second image.

In embodiments of the present disclosure, the scene type may be classified according to, for example, the distance from the background to the foreground in the acquired first image, the distance from the background to the TOF camera, or the ambient light brightness, which is not limited in the present disclosure.

In some implementations, the correspondence relation between depths and confidence coefficients of the depths in different first images and the scene types can be set in advance. Therefore, in the present disclosure, after the first image is acquired, the scene type can be determined by querying the above correspondence relation according to the depth of the first image and the confidence coefficient of the depth.

As an example, the scene type is classified according to the distance from the background to the foreground in the first image and the distance from the background to the TOF camera. When the distance from the background to the TOF camera is large, for example, greater than a first distance threshold (such as 1.5 meters), it is determined that the scene type is scene type one. When the distance between the background and the foreground is small, for example, less than a second distance threshold (such as 0.2 meters), it is determined that the scene type is scene type two. When the distance between the background and the foreground is large, for example, greater than a third distance threshold (for example, 0.3 meters), the scene type is determined as scene type three. The correspondence relation between the distance and the scene type is established. Therefore, in the present disclosure, after the first image is acquired, the distance between the background and the foreground, and the distance from the background to the TOF camera may be determined according to the depth and the confidence coefficient of the depth in the first image. According to the determined result, the scene type may be determined by querying the above-mentioned correspondence relation.

In another possible implementation, a region of interest may be identified from the second image, and the depth corresponding to each pixel unit in the region of interest and the confidence coefficient of the depth are determined in the first image according to the mapping relation between the first image and the second image. Further, the scene type may be determined according to the depth and the confidence coefficient of the depth corresponding to each pixel unit in the region of interest.

At step 103, filtering process is performed on the first image according to the scene type.

In embodiments of the present disclosure, after determining the scene type, it is determined whether the depth corresponding to each pixel unit in the first image needs to be filtered according to the scene type.

Referring to the above example, when the scene type is scene type two, the foreground and background are close, the foreground edges are clear, and the phenomenon of fly pixel points is not obvious. Therefore, there is no need to perform filtering process on the depth information of each pixel unit in the first image. When the scene type is scene type one or scene type three, the distance between the foreground and the background is far, or the depth of the background is large; under these circumstances, the edges of the foreground may be blurred and the phenomenon of fly pixel points is obvious. Therefore, it may be determined that the depth information of each pixel unit in the first image needs to be filtered.

With the depth image processing method according to embodiments of the present disclosure, the first image acquired by the depth sensor and the second image acquired by the image sensor are acquired, the scene type is determined according to the first image and the second image, and the filtering process is performed on the first image according to the scene type. Therefore, filtering process may be performed adaptively on the depth image by selecting a filtering mode according to different scene types, to output a high-quality depth image, thereby improving the quality of the depth image.

Figure 2:
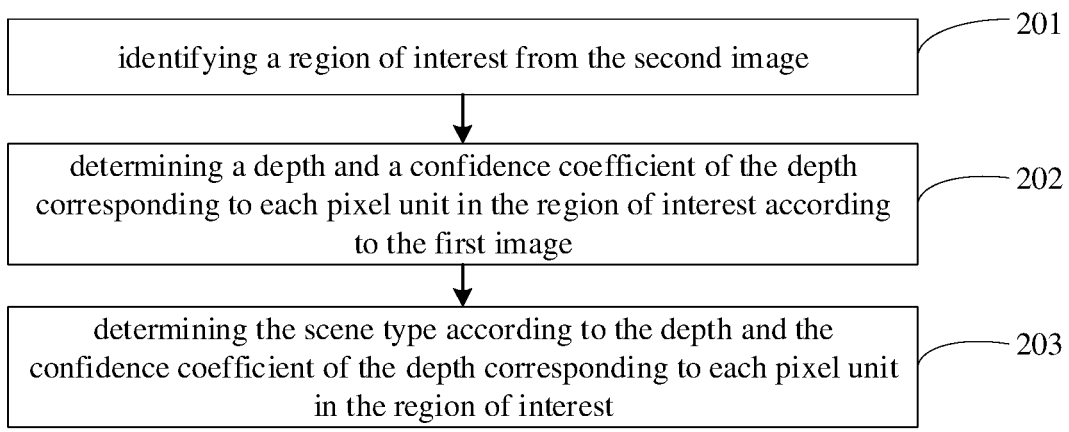
FIG. 2 is a flowchart of a depth image processing method according to Embodiment 2 of the present disclosure.

In some implementations, at step 102, the region of interest may be identified from the second image, and the scene type is determined according to the depth and confidence coefficient of the depth corresponding to each pixel unit in the corresponding region of interest in the first image. The above process is described in detail in combination with Embodiment 2. FIG. 2 is a flowchart of a depth image processing method according to Embodiment 2 of the present disclosure.

As illustrated in FIG. 2, step 102 further includes the following steps.

At step 201, a region of interest is identified from the second image.

In embodiments of the present disclosure, the region of interest (ROI) may be a region where an object of interest to a user is located. The object of interest may be preset in a built-in program of the electronic device. Alternatively, in order to satisfy the individual requirements of the user, the object of interest may also be set by the user. For example, the electronic device may provide an input interface, and the user may input the object of interest on the input interface according to his own needs, which is not limited in the present disclosure.

For example, the region where the object of interest is located, i.e., the ROI, may be the region where plants, animals, buildings, and people are located, or, for a portrait scene, the ROI may be a local area of the human portrait, such as a human face area, a hand area, a waist area, a leg area, a foot area, which is not limited herein.

In some implementations, in order to improve the accuracy of result of identifying the region of interest, the region of interest may be identified in the second image by using the image processing technology based on deep learning.

For example, a semantic segmentation model may be used to identify the second image and determine the region of interest. The semantic segmentation model may be any semantic segmentation model, such as deeplab, and psp, which are not limited herein. In detail, training images may be collected in advance, or downloaded from the Internet, and then the region where the object of interest is located may be labeled in the training images. The labeled training images are used to train the initial semantic segmentation model. The trained semantic segmentation model may learn the correspondence between the image and the region of interest.

Alternatively, a pre-trained identification model is adopted to identify the second image and determine the region of interest. The pre-trained recognition model has been trained to learn the correspondence relation among color features, shape features, edge features, and/or texture features and regions of interest. Other models can also be adopted.

In another possible implementation, the region of interest may also be identified from the second image by using RGB color segmentation method. For example, when the region of interest is the hand region, the second image in the RGB color space may be converted to an HSV color space for hand skin detection, and the detection result may be binarized. For example, when skin is detected, the value of the corresponding pixel unit is set to 1; when no skin is detected, the value of the corresponding pixel unit is set to 0. Then the number of pixel units is counted for each region containing pixel units of value 1, so that the region with the maximum statistical result is determined as the hand region.

It should be noted that the region of interest may also be identified from the second image based on other algorithms, which is not limited in the present disclosure.

At step 202, a depth and a confidence coefficient of the depth corresponding to each pixel unit in the region of interest is determined according to the first image.

In embodiments of the present disclosure, after the region of interest is identified from the second image, a target region corresponding to the region of interest in the second image may be determined in the first image according to the mapping relation between the first image and the second image.

In detail, after the region of interest is identified from the second image, for each pixel unit in the region of interest, according to the mapping relation between the first image and the second image, the depth and the confidence coefficient of the depth corresponding to each pixel unit in the region of interest may be determined in the first image.

At step 203, the scene type is determined according to the depth and the confidence coefficient of the depth corresponding to each pixel unit in the region of interest.

In embodiments of the present disclosure, after determining the depth and the confidence coefficient of the depth corresponding to each pixel unit in the region of interest, the scene type is determined according to the depth and the confidence coefficient of the depth corresponding to each pixel unit in the region of interest.

As a possible implementation, the correspondence relation between different depths and confidence coefficients of depths and the scene types may be set in advance. Therefore, in the present disclosure, after determining the depth and the confidence coefficient of the depth corresponding to each pixel unit in the region of interest, the scene type may be determined by querying the above correspondence relation according to the depth and the confidence coefficient of the depth.

As an example, the scene type is classified according to the distance from the background to the foreground and the distance from the background to the TOF camera in the first image. When the distance from the background to the TOF camera is far, for example, greater than a first threshold, it is determined that the scene type is scene type one. When the distance between the background and the foreground is close, such as less than a second threshold, it is determined that the scene type is scene type two. When the distance between the background and the foreground is far, for example, greater than the second threshold and less than a third threshold, the scene type is determined as scene type three. In this way, the correspondence relation between the distance and the scene type is established. Therefore, in the present disclosure, after determining the depth and the confidence coefficient of the depth corresponding to each pixel unit in the region of interest, the distance from the background to the foreground and the distance from the background to the TOF camera may be determined according to the depth and the confidence coefficient of the depth corresponding to each pixel unit in the region of interest. According to the determined result, the scene type to which the region of interest belongs may be determined by querying the above-mentioned correspondence relation.

As another possible implementation, statistics may be separately performed on the depths corresponding to respective pixel units in the region of interest and the confidence coefficients of the depths corresponding to respective pixel units in the region of interest, to obtain the depth distribution and the confidence coefficient distribution, so that according to the depth distribution and the confidence coefficient distribution, the scene type may be determined.

The depth distribution is used to indicate a proportion of pixel units in each depth interval, and the confidence coefficient distribution is used to indicate a proportion of pixel units in each confidence interval.

With the depth image processing method according to embodiments of the present disclosure, the region of interest is identified from the second image, the depth and the confidence coefficient of the depth corresponding to each pixel unit in the region of interest are determined according to the first image, and the scene type is determined according to the depth and the confidence coefficient of the depth corresponding to each pixel unit in the region of interest. Therefore, the scene type is determined according to the depth and the confidence coefficient of the depth corresponding to each pixel unit in the region of interest, thus filtering process can be performed adaptively on the depth and the confidence coefficient of the depth corresponding to each pixel unit in the first image by selecting the filtering mode according to different scene type, to output the region of interest with the high quality, thereby improving the quality of the depth image in the region of interest.

As a possible implementation, the scene where the background is far away, for example exceeds the measurement range, may be used as the first scene type, the scene where the background is within the measurement range and the distance between the foreground and the background is far can be used as the second scene type, and the scene where the background is within the measurement range and the distance between the foreground and the background is relatively close can be used as the third scene type.

Therefore, in the present disclosure, after determining the depth and the confidence coefficient of the depth corresponding to each pixel unit in the region of interest, statistics may be performed on the depths corresponding to respective pixel units in the region of interest to obtain the depth distribution, and statistics may be performed on the confidence coefficients to obtain the distribution of confidence coefficient, and the distance between the background and the foreground and the distance from the background to the TOF camera may be determined, and thus the scene type to which the region of interest belongs is determined according to the above determined result. The above process is described in detail in combination with Embodiment 3.

Figure 3:
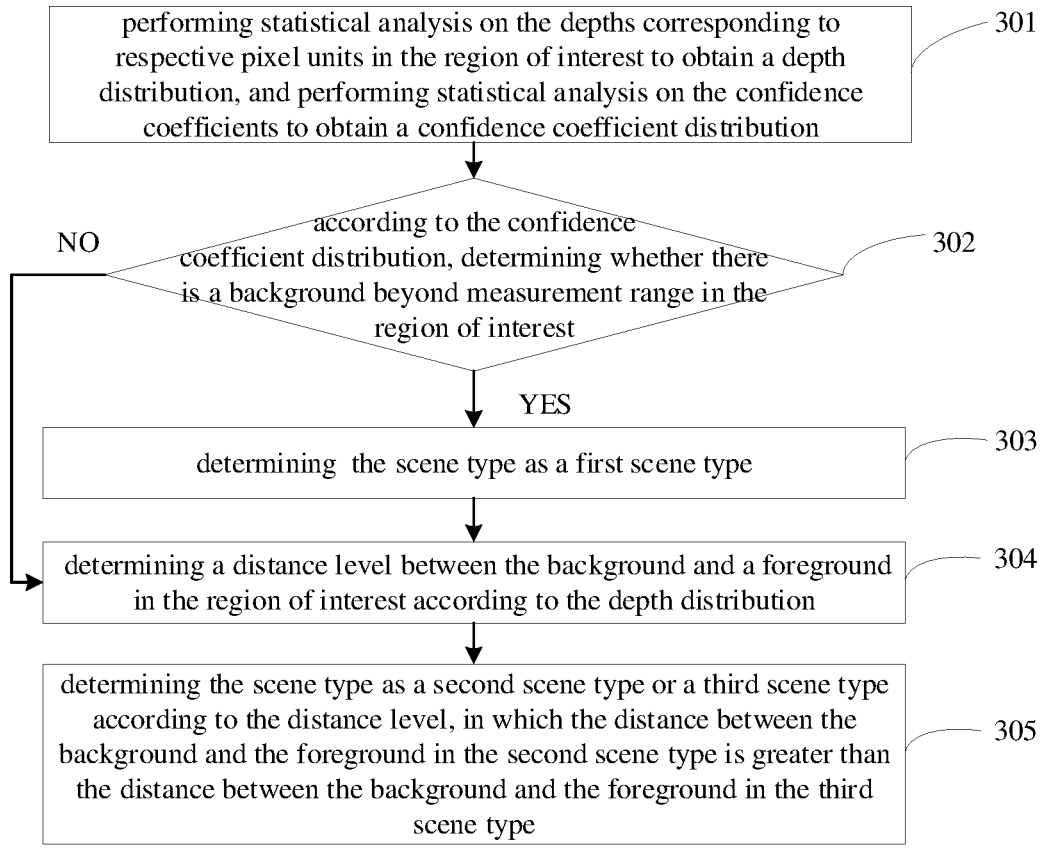
FIG. 3 is a flowchart of a depth image processing method according to Embodiment 3 of the present disclosure.

FIG. 3 is a flowchart of a depth image processing method according to Embodiment 3 of the present disclosure.

As illustrated in FIG. 3, based on FIG. 2, step 203 further includes the following sub-steps.

At step 301, statistical analysis is performed on the depths corresponding to respective pixel units in the region of interest to obtain the depth distribution, and statistical analysis is performed on the confidence coefficients to obtain the confidence coefficient distribution.

In embodiments of the present disclosure, after identifying the region of interest from the second image, and after determining the depth and the confidence coefficient of the depth corresponding to each pixel unit in the region of interest according to the first image, statistical analysis is performed on respective pixel units in the first image to obtain the depth distribution and the confidence coefficient distribution.

As a possible implementation, statistical analysis is performed on respective pixel units in the first image to obtain the depth distribution. In detail, for the obtained first image, depth intervals are set in advance, and then the number of the pixel units in each depth interval in the first image are counted. The ratio of the number of pixel units in each depth interval to the total number of pixel units in the first image is calculated, the proportion of pixel units in each depth interval is obtained, and further the depth distribution is obtained. Thus, the depth distribution of the scene within the effective measurement range can be determined.

As another possible implementation, statistical analysis is performed on pixel units in the first image to obtain the confidence coefficient distribution. In detail, for the obtained first image, confidence intervals are set in advance, and the number of pixel units whose depth belongs to the corresponding confidence interval is counted, the ratio of the number of the pixel units to the total number of pixel units in the first image is calculated, and a proportion of the pixel units in the corresponding confidence interval is obtained, thereby obtaining the confidence coefficient distribution.

At step 302, it is determined whether there is a background beyond the measurement range in the region of interest according to the confidence coefficient distribution, and if yes, step 303 is executed, and if no, step 304 is executed.

It should be noted that the closer the background is to the TOF camera, the larger the confidence coefficient of the depth is, and the farther the background is to the TOF camera, the smaller the confidence coefficient of the depth is. Therefore, in this embodiment of the present disclosure, whether a background beyond the measurement range exists in the region of interest may be determined according to the confidence coefficient distribution corresponding to respective pixel units in the region of interest.

As a possible implementation, it may be determined whether there is a pixel unit with a confidence coefficient less than the first confidence threshold in the region of interest. If yes, then it is determined that there is a background beyond the measurement range in the region of interest, otherwise, there is no background beyond the measurement range in the region of interest.

The first confidence threshold may be determined in advance according to the measurable range. For example, the measurable range corresponding to closeup shooting (shooting an image of a near scene) may be determined in advance, so that the first confidence threshold may be determined based on the measurable range. Alternatively, the measurable range corresponding to distant shooting (shooting an image of a far scene) may be determined in advance, so that the first confidence threshold is determined according to the measurable range. When the user captures an image, it may be determined whether the shooting is close shooting or distant shooting according to the user's operation, so that the corresponding first confidence threshold may be determined.

It should be noted that, there may be abnormal points or interference points in the region of interest, or only a small background region exists in the region of interest, for example, only a small corner exists in the region of interest. Therefore, if there are only a few or a small number of pixel units whose confidence coefficient of the depth is less than the confidence threshold in the second image, it is obviously unreasonable to determine that there is a background beyond the measurement range in the region of interest.

Therefore, as another possible implementation, in order to improve the accuracy of the determination result, the number of pixel units in the region of interest whose corresponding confidence coefficient is less than the confidence threshold may be counted to obtain the first number, the ratio of the first number to the total number of pixels in the region of interest is determined to obtain a first ratio, and it is determined whether the first ratio is greater than the first threshold. If the ratio is greater than the first threshold, it is determined that there is a background beyond the measurement range in the region of interest, otherwise, it is determined that there is no background beyond the measurement range in the region of interest. The first ratio is preset, for example, the first ratio may be 10%.

At step 303, the scene type is determined as a first scene type, in response to determining that a background beyond the measurement range is present in the region of interest.

In the present disclosure, the scene type to which the region of interest belongs is determined as the first scene type, in response to determining that the background beyond the measurement range is present in the region of interest, that is, the background is far.

At step 304, in response to determining that there is no background beyond the measurement range in the region of interest, a distance level between the background and the foreground in the region of interest is determined according to the depth distribution.

In embodiments of the present disclosure, in response to determining that there is no background beyond the measurement range, the distance level between the background and the foreground in the region of interest may be determined according to the depth distribution corresponding to respective pixel units in the region of interest.

As a possible implementation, a maximum depth and a minimum depth may be determined according to the depth distribution of respective pixel units in the region of interest, and the distance level between the background and foreground in the region of interest is determined according to the ratio or difference between the maximum depth and the minimum depth.

It should be noted that there may be abnormal points and interference points in the region of interest, resulting in that the confidence coefficient of the depth of the corresponding pixel unit is relatively small (away from the camera), and it is obviously unreasonable that the depth corresponding to such pixel unit is used as the maximum depth. Therefore, as another possible implementation, in order to improve the accuracy of the determination result, target depths whose confidence coefficient is greater than the second confidence threshold may be selected from the depths of respective pixel units for the region of interest, and the maximum depth and the minimum depth are determined in the target depths, so that the distance level between the background and the foreground in the region of interest may be determined according to the ratio or difference between the maximum depth and the minimum depth. The second confidence threshold is predetermined.

For example, it is determined that, the larger the ratio between the maximum depth and the minimum depth, or the larger the difference between the maximum depth and the minimum depth, the larger the distance level, and the smaller the ratio between the maximum depth and the minimum depth, or the smaller the difference between the maximum depth and the minimum depth, the smaller the distance level. The larger the distance level, the farther the distance between the foreground and the background, and the smaller the distance level, the closer the distance between the foreground and the background.

At step 305, the scene type is determined as a second scene type or a third scene type according to the distance level, in which the distance between the background and the foreground in the scene of the second scene type is greater than the distance between the background and the foreground in the scene of the third scene type.

In embodiments of the present disclosure, after the distance level is determined, it is possible to determine whether the region of interest belongs to the second scene type or the third scene type according to the distance level. The distance between the background and the foreground in the second scene type is greater than the distance between the background and the foreground in the third scene type.

As a possible implementation, a correspondence relation between the distance level and the scene type may be established in advance. In the present disclosure, after the distance level is determined, the foregoing correspondence relation may be queried to determine the scene type to which the region of interest belongs.

For example, when the ratio or difference between the maximum depth and the minimum depth is within a first range, the distance level is determined to be level one, and when the ratio or difference between the maximum depth and the minimum depth is within a second range, the distance level is determined to be the level two, and a correspondence relation between level one and scene type three, and level two and scene type two is established. Therefore, in the present disclosure, after determining the maximum depth and the minimum depth, it may be determined whether the ratio or difference between the maximum depth and the minimum depth is within the first range or the second range. If it is within the first range, the distance level is determined to be level one, and the region of interest belongs to the third scene type. If it is within the second range, the distance level is determined to be level two, and the region of interest belongs to the second scene type.

The depth image processing method in embodiments of the present disclosure may improve the accuracy of the determination result by determining the scene type to which the region of interest belongs according to the depth and the confidence coefficient of depth corresponding to each pixel unit in the region of interest.

In embodiments of the present disclosure, after determining the scene type to which the region of interest belongs according to Embodiment 3, with respect to step 202, when the scene type to which the region of interest belongs is the first scene type or the second scene type, since the distance between the foreground and the background is far, or the depth of the background is large, the edges of the foreground may be blurred and the phenomenon of fly pixel points is obvious, and therefore, it may be determined that the first image needs to be filtered. When the scene type to which the region of interest belongs is the third scene type, since the foreground and background are relatively close, the foreground edges are clear, and the phenomenon of fly pixel points is not obvious, and therefore, it may be determined that a better first image may be obtained without filtering.

As a possible implementation, after it is determined that the first image needs to be filtered according to the foregoing embodiment, a corresponding target confidence threshold may be determined according to the scene type, and then the depth of the pixel unit in the first image whose confidence coefficient is less than the target confidence threshold is deleted. Specifically, for each pixel unit in the first image, the confidence coefficient of the depth corresponding to the pixel unit may be compared with the target confidence threshold. If the confidence coefficient of the depth corresponding to the pixel unit is less than the target confidence threshold, the depth corresponding to the pixel unit is deleted. If the confidence coefficient of the depth corresponding to the pixel unit is greater than or equal to the target confidence threshold, the depth corresponding to the pixel unit is retained. Therefore, only the depth corresponding to the pixel unit with high confidence coefficient can be retained, and the depth corresponding to the pixel unit with lower confidence coefficient is deleted as noise data, thus abnormal points such as fly pixel points, can be effectively removed from the depth image, and the smoothness of the depth image can be improved.

The average value of the confidence coefficients may be determined according to the confidence coefficients of the depths corresponding to respective pixel units in the region of interest, and the target confidence threshold may be determined based on the average value. Alternatively, the median value of the confidence coefficients may be determined according to the confidence coefficients corresponding to respective pixel units in the region of interest, and the target confidence threshold may be determined according to the median value. Or, the target confidence threshold may be determined according to other algorithms, which is not limited in this disclosure.

Figure 4:
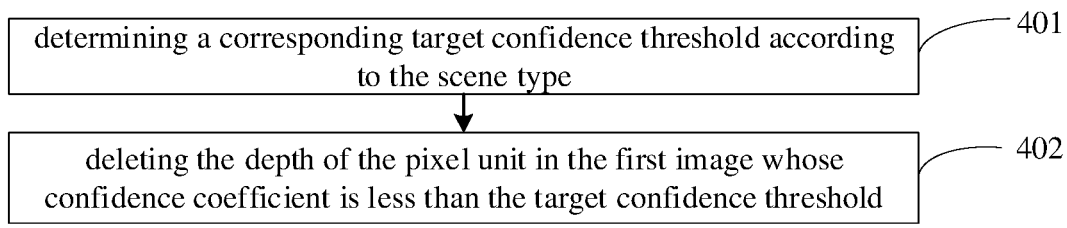
FIG. 4 is a flowchart of a depth image processing method according to Embodiment 4 of the present disclosure.

As a possible implementation, on the basis of the embodiment described in FIG. 3, after determining the scene type according to the depth distribution and the confidence coefficient distribution, the first image is filtered according to the scene type. The above process is described in detail in combination with Embodiment 4. FIG. 4 is a flowchart of a depth image processing method according to Embodiment 4 of the present disclosure.

As illustrated in FIG. 4, after step 305, the method further includes the following steps.

At step 401, a corresponding target confidence threshold is determined according to the scene type.

In embodiments of the present disclosure, when the determined scene type is different, a corresponding threshold determination strategy may be determined according to the scene type, so that the confidence coefficients of respective pixel units in the first image may be processed according to the threshold determination strategy, to obtain the target confidence threshold.

In a possible case, when the scene type is determined to be the first scene type, the pixel units can be sorted according to the confidence coefficients corresponding to respective pixel units in the region of interest from large to small, so as to obtain a plurality of pixel units ranked at the top. Furthermore, the target confidence threshold is determined according to the median value of the confidence coefficients corresponding to the plurality of pixel units.

In embodiments of the present disclosure, for the region of interest, the confidence coefficients of all pixel units in the region of interest may be arranged in order according to the confidence coefficients, for example, according to the confidence coefficients from large to small, to obtain the plurality of pixel units ranked at the top.

It should be noted that the number of the plurality of pixel units may be a product of the total number of pixel units included in the region of interest and a fixed ratio, in which 0<fixed ratio≤1. The fixed ratio may be set in advance by a built-in program of the electronic device, or may be set by a user, which is not limited. For example, the fixed ratio may be 10%.

In addition, the number of the plurality of pixel units may also have a positive relation with the total number of pixel units included in the region of interest, that is, the number of the plurality of pixel units may increase as the increasing of the total number of pixel units included in the region of interest, or the number of the plurality of pixel units may decrease as the decreasing of the total number of pixel units included in the region of interest.

In embodiments of the present disclosure, after determining the plurality of pixel units ranked at the top, for example, the number of the plurality of pixel units is marked as N. If N is an odd number, the median value of the confidence coefficients corresponding to the plurality of pixel units may be the confidence coefficient of the depth corresponding to the pixel unit at the (N+1)/2th position in the sequence. If N is an even number, the median value of the confidence coefficients of the plurality of pixel units may be the confidence coefficient of the depth corresponding to the pixel unit at the N/2th position in the sequence, or the confidence coefficient of the depth corresponding to the pixel unit at the (N/2+1)th position in the sequence, or the mean value of the confidence coefficient of the depth corresponding to the pixel unit at the N/2th position in the sequence and the confidence coefficient of the depth corresponding to the pixel unit at the (N/2+1)th position. After determining the median value of the confidence coefficients corresponding to the plurality of pixel units, the median value may be used as the target confidence threshold.

In another possible case, when the scene type is determined as the second scene type, respective pixel units in the first image may be divided into a first portion and a second portion, and a confidence coefficient variance between the first portion and the second portion is the largest. The confidence coefficient of the depth corresponding to the pixel unit in the first portion is greater than the confidence coefficient of the depth corresponding to the pixel unit in the second portion. Furthermore, the target confidence threshold is determined according to the confidence coefficients of the depths corresponding to respective pixel units in the first portion.

At step 402, the depth of the pixel unit in the first image having the confidence coefficient less than the target confidence threshold is deleted.

In embodiments of the present disclosure, after the corresponding target confidence threshold is determined according to the scene type, the confidence coefficient of the depth corresponding to each pixel unit in the first image may be compared with the target confidence threshold, and the depth of the pixel unit whose confidence coefficient is less than the target confidence threshold may be deleted. Therefore, a high-quality first image may be output, and abnormal points in the first image, such as fly pixel points, may be effectively removed to improve the smoothness of the first image.

The depth image processing method according to embodiments of the present disclosure determines the corresponding target confidence threshold according to the scene type, and deletes the depth of the pixel unit whose confidence coefficient is less than the target confidence threshold. Thereby, it is possible to determine a corresponding target confidence threshold for a scene type, so that the depth image is filtered according to the target confidence threshold, and the quality of the depth image may be improved.

As a possible implementation, after performing filtering processing on each pixel unit in the first image, the pixel units in the first image after filtering may be aligned with the pixel units in the second image, so that the depth corresponding to each pixel unit in the second image may be determined according to the aligned second image and first image. The above process is described in detail in combination with Embodiment 5.

Figure 5:
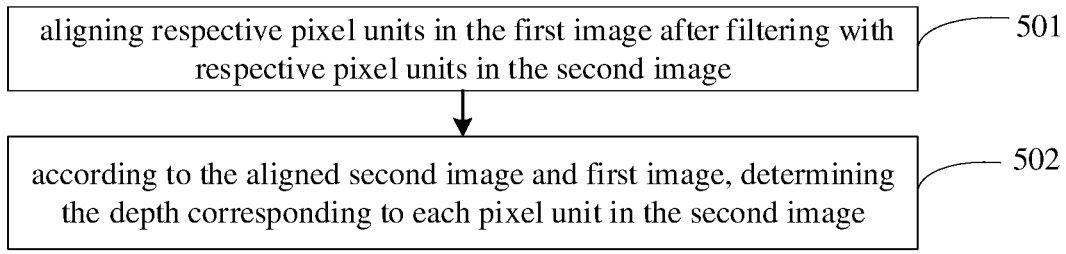
FIG. 5 is a flowchart of a depth image processing method according to Embodiment 5 of the present disclosure.

FIG. 5 is a flowchart of a depth image processing method according to Embodiment 5 of the present disclosure.

As illustrated in FIG. 5, based on the above embodiments, the depth image processing method may further include the following steps.

At step 501, respective pixel units in the first image after filtering are aligned with respective pixel units in the second image.

In embodiments of the present disclosure, the alignment process may include steps such as de-distortion and coordinate conversion.

It should be noted that when collecting images, the image coordinates are converted into the camera coordinate system. Since the camera lens may have some distortion, including lateral distortion and/or tangential distortion, de-distortion processing is performed on the filtered first image and/or second image, so as to improve the image processing effect. In detail, through camera calibration, internal parameters of the camera may be determined, including focal length, optical center, and distortion coefficient. Therefore, during the de-distortion processing, camera lens distortion processing may be performed, and the camera coordinates are converted to image coordinates.

It is understood that the spatial coordinate systems of RGB image data and first image data are different. The origin of the former is an RGB camera, and the origin of the latter is an infrared camera, and thus there is corresponding error between the two. 2D points on the first image may be converted to 3D points in the world coordinate system, and then 3D points in the world coordinate system are projected onto the second image.

At step 502, the depth corresponding to each pixel unit in the second image is determined according to the aligned second image and first image.

In embodiments of the present disclosure, after the second image is aligned with the first image, the depth corresponding to each pixel unit in the second image may be determined according to the aligned second image and first image. In detail, for each pixel unit in the second image, the depth corresponding to the corresponding pixel unit in the first image may be used as the depth corresponding to the pixel unit.

It should be noted that the installation positions of the TOF camera and the RGB camera are different, and the shooting angles of the two are different. After aligning the first image with the second image, some pixel units in the second image may lack corresponding depths. Therefore, in the present disclosure, the depths of the second image may be smoothed to supplement the missing depths. For example, for each pixel unit with missing depth in the second image, the depths corresponding to the pixel units around the pixel unit may be used to determine the depth of the pixel unit. For example, the mean value of the depths corresponding to the pixel units around the pixel unit may be taken as the depth of the pixel unit.

Figure 6:
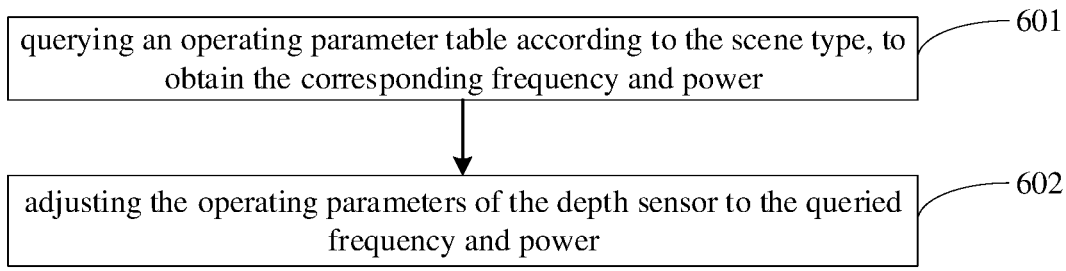
FIG. 6 is a flowchart of a depth image processing method according to Embodiment 6 of the present disclosure.

As a possible implementation, after identifying the scene type based on the first image and the synchronously acquired second image, the operating parameters of the depth sensor may also be adjusted according to the determined scene type. The above process is described in detail in combination with Embodiment 6. FIG. 6 is a flowchart of a depth image processing method according to Embodiment 6 of the present disclosure.

As illustrated in FIG. 6, based on the above embodiments, the depth image processing method may further include the following steps.

At step 601, an operating parameter table is queried according to the scene type, to obtain the corresponding frequency and power.

The operating parameter table may be obtained according to an experimental test, and may also be calculated according to TOF hardware parameters. Certainly, it may also be generated by other methods, which is not limited in this embodiment.

As a possible implementation, the correspondence relation between the operating parameters of the depth sensor and the scene type may be stored in the operating parameter table in advance. Therefore, in this embodiment, after determining the scene type, the foregoing operating parameter table may be queried to obtain frequency and power corresponding to the scene type.

For example, the correspondence relation between the operating parameters of the depth sensor and the scene type stored in the operating parameter table is as follows. The first scene type corresponds to dual frequency and high power, the second scene type corresponds to single frequency or dual frequency and medium power, and the third scene type corresponds to single frequency and low power. In this example, in response to determining that the scene type is the third scene type, at this time, the background is relatively close, and the depth sensor may be adjusted to emit infrared light with single frequency and low power.

It should be noted that, in this embodiment, when the depth sensor collects the first image, the frequency of the infrared light emitted includes two cases: single frequency and dual frequency. For example, the depth sensor may emit light of any one of two frequencies of 40 Hz and 60 Hz, and can may emit light at two frequencies of 40 Hz and 60 Hz at the same time.

At step 602, the operating parameters of the depth sensor are adjusted to the queried frequency and power.

In embodiments of the present disclosure, after querying the operating parameter table according to the scene type to obtain the corresponding frequency and power, the operating parameters of the depth sensor are adjusted to the queried frequency and power.

In embodiments of the present disclosure, by querying the operating parameter table according to the scene type, the corresponding frequency and power are obtained, and the operating parameters of the depth sensor are adjusted to the queried frequency and power. Therefore, by adjusting the operating parameters of the depth sensor to the operating parameters corresponding to different scene types, the technical problem of lower quality of the collected depth image caused by using the depth sensor with fixed operating parameters to collect the depth images in different scenarios in the related art may be avoided, thereby ensuring the quality of the output depth image.

In order to implement the above embodiments, the present disclosure further provide a depth image processing apparatus.

Figure 7:
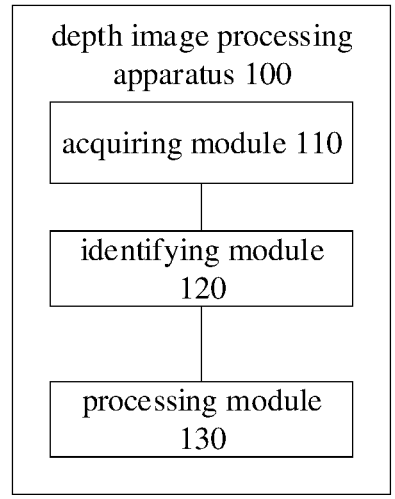
FIG. 7 is a block diagram of a depth image processing apparatus according to Embodiment 7 of the present disclosure.

FIG. 7 is a block diagram of a depth image processing apparatus according to Embodiment 7 of the present disclosure.

As illustrated in FIG. 7, the depth image processing apparatus 100 includes: an acquiring module 110, an identifying module 120, and a processing module 130.

The acquiring module 110 is configured to acquire a first image acquired by a depth sensor and an image acquired by an image sensor.

In embodiments of the present disclosure, the electronic device may include a depth sensor, and a first image is acquired through the depth sensor, and each pixel unit in the acquired first image has a corresponding depth and a confidence coefficient of the depth.

In a possible implementation, the depth sensor may be a TOF camera. The TOF camera may include an infrared light source through which a light signal is emitted outwardly, and a photosensitive module configured to receive reflected light signal, so that distance measurement may be performed according to phase change of the emitted light signal and the reflected light signal, thereby obtaining depth information.

In other words, the depth corresponding to each pixel unit is generated based on the phase difference of infrared light, and the confidence coefficient of the depth is determined based on the light intensity of the infrared light. The closer the distance to the TOF camera, the smaller the depth, and the larger the confidence coefficient of the depth. The farther the distance to the TOF camera, the larger the depth, the smaller the confidence coefficient of the depth.

In embodiments of the present disclosure, the second image is two-dimensional, and may be acquired by an image sensor of the electronic device. For example, the electronic device may include an RGB camera, and the second image is acquired through the RGB camera.

It should be noted that the second image and the first image are acquired synchronously, for example, the RGB sensor and the depth sensor of the electronic device are configured to acquire the second image and the first image simultaneously.

The identifying module 120 is configured to determine a scene type according to the first image and the second image.

In embodiments of the present disclosure, the scene type may be classified according to the distance from the background to the foreground in the acquired first image, the distance from the background to the TOF camera, or the ambient light brightness, which is not limited in the present disclosure.

In a possible implementation, the correspondence relation between depths and confidence coefficients of the depths in different first images and the scene types may be set in advance. Therefore, in the present disclosure, after the first image is collected, the scene type may be determined by querying the above correspondence relation according to the depth of the first image and the confidence coefficient of the depth.

As an example, the scene type is classified according to the distance from the background to the foreground in the first image and the distance from the background to the TOF camera. When the distance from the background to the TOF camera is far, for example, greater than a first distance threshold (such as 1.5 meters), it is determined that the scene type is scene type one. When the distance between the background and the foreground is close, for example, less than a second distance threshold (such as 0.2 meters), it is determined that the scene type is scene type two. When the distance between the background and the foreground is far, for example, greater than a third distance threshold (for example, 0.3 meters), the scene type is determined as scene type three. The corresponding relation between the distance and the scene type is established. Therefore, in the present disclosure, after the first image is collected, the distance between the background and the foreground, and the distance from the background to the TOF camera may be determined according to the depth and the confidence coefficient of the depth in the first image. According to the determined result, the scene type may be determined by querying the above-mentioned correspondence relation.

In another possible implementation, a region of interest may be identified from the second image, and the depth corresponding to each pixel unit in the region of interest and the confidence coefficient of the depth are determined in the first image according to the mapping relation between the first image and the second image. The scene type may be determined according to the depth and the confidence coefficient of the depth corresponding to each pixel unit in the region of interest.

The processing module 130 is configured to perform a filtering process on the first image according to the scene type.

In embodiments of the present disclosure, after determining the scene type, it is determined whether the depth corresponding to each pixel unit in the first image needs to be filtered according to the scene type.

Taking the above example as an example, when the scene type is scene type two, the foreground and background are close, the foreground edges are clear, and the phenomenon of fly pixel points is not obvious. Therefore, there is no need to perform filtering process on the depth information of each pixel unit in the first image. When the scene type is scene type one or scene type three, the distance between the foreground and the background is far, or the depth of the background is large, and in this case, the edges of the foreground may be blurred and the phenomenon of fly pixel points is obvious, and therefore, it may be determined that the depth information of each pixel unit in the first image needs to be filtered.

Figure 8:
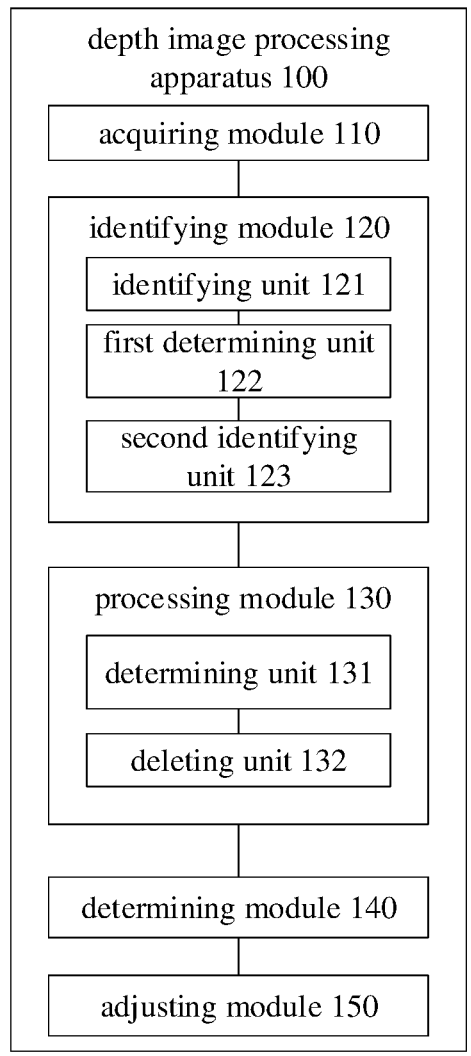
FIG. 8 is a block diagram of another depth image processing apparatus according to Embodiment 7 of the present disclosure.

Further, in a possible implementation of the embodiment of the present disclosure, referring to FIG. 8, based on the embodiment illustrated in FIG. 6, the depth image processing apparatus may further include followings.

The identifying module 120 includes an identifying unit 121, a first determining unit 122 and a second determining unit 123.

The identifying unit 121 is configured to identify the region of interest from the second image.

In embodiments of the present disclosure, ROI may be a region where an object of interest to a user is located. The object of interest may be preset in a built-in program of the electronic device. Alternatively, in order to satisfy the individual requirements of the user, the object of interest may also be set by the user. For example, the electronic device may provide an input interface, and the user may input the object of interest on the input interface according to his own needs, which is not limited in the present disclosure.

In a possible implementation, in order to improve the accuracy of the result of identifying the region of interest, the region of interest may be identified in the second image by using the image processing technology based on deep learning.

For example, a semantic segmentation model may be used to identify the second image and determine the region of interest. The semantic segmentation model may be a more mature semantic segmentation model in the related art, such as deeplab, and psp, which are not limited herein. In detail, training images may be collected in advance, or downloaded from the Internet, and then the region where the object of interest is located may be labeled in the training images. The labeled training images are used to train the initial semantic segmentation model. The trained semantic segmentation model may learn the correspondence between the image and the region of interest.

Alternatively, a pre-trained identification model is adopted to identify the second image and determine the region of interest. The pre-trained identification model has learned the correspondence relation among color features, shape features, edge features, and/or texture features and regions of interest.

In another possible implementation, the region of interest may also be identified from the second image by using RGB color segmentation method. For example, when the region of interest is the hand region, the second image in the RGB color space may be converted to an HSV color space for hand skin detection, and the detection result may be binarized. For example, when skin is detected, the value of the corresponding pixel unit is set to 1, and when no skin is detected, the value of the corresponding pixel unit is set to 0, and then the number of pixel units is counted for each region containing pixel units of value 1, so that the region with the maximum statistical result is determined as the hand region.

It should be noted that the region of interest may also be identified from the second image based on other algorithms, which is not limited in the present disclosure.

The first determining unit 122 is configured to determine the depth and the confidence coefficient of the depth corresponding to each pixel unit in the region of interest according to the first image.

In embodiments of the present disclosure, after the region of interest is identified from the second image, the first determining unit 122 may determine a target region corresponding to the region of interest in the first image based on the mapping relation between the first image and the second image.

In detail, after the region of interest is identified from the second image, for each pixel unit in the region of interest, according to the mapping relation between the first image and the second image, the depth and the confidence coefficient of the depth corresponding to each pixel unit in the region of interest may be determined in the first image.

The second determining unit 123 is configured to determine the scene type according to the depth and the confidence coefficient of the depth corresponding to each pixel unit in the region of interest.

In embodiments of the present disclosure, after determining the depth and the confidence coefficient of the depth corresponding to each pixel unit in the region of interest, the scene type is determined according to the depth and the confidence coefficient of the depth corresponding to each pixel unit in the region of interest.

As a possible implementation, the correspondence relation between different depths and confidence coefficients of the depths and the scene types may be set in advance. Therefore, in the present disclosure, after determining the depth and the confidence coefficient of the depth corresponding to each pixel unit in the region of interest, the scene type may be determined by querying the above correspondence relation according to the depth and the confidence coefficient of the depth.

As an example, the scene type is classified according to the distance from the background to the foreground and the distance from the background to the TOF camera in the first image. When the distance from the background to the TOF camera is far, for example, greater than a first threshold, it is determined that the scene type is scene type one. When the distance between the background and the foreground is close, such as less than a second threshold, it is determined that the scene type is scene type two. When the distance between the background and the foreground is far, for example, greater than the second threshold and less than a third threshold, the scene type is determined as scene type three. In this way, the correspondence relation between the distance and the scene type is established. Therefore, in the present disclosure, after determining the depth and the confidence coefficient of the depth corresponding to each pixel unit in the region of interest, the distance from the background to the foreground and the distance from the background to the TOF camera may be determined according to the depth and the confidence coefficient of the depth corresponding to each pixel unit in the region of interest. According to the determined result, the scene type to which the region of interest belongs may be determined by querying the above-mentioned correspondence relation.

As another possible implementation, statistics may be separately performed on the depths corresponding to respective pixel units in the region of interest and the confidence coefficients of the depths corresponding to respective pixel units in the region of interest, to obtain the depth distribution and the confidence coefficient distribution, so that according to the depth distribution and the confidence coefficient distribution, the scene type may be determined.

The depth distribution is used to indicate a proportion of pixel units in each depth interval, and the confidence coefficient distribution is used to indicate a proportion of pixel units in each confidence interval.

As another possible implementation, the second determining unit 123 is configured to perform statistical analysis on the depths corresponding to respective pixel units in the region of interest to obtain the depth distribution, and perform statistical analysis on the confidence coefficients to obtain the confidence coefficient distribution, and determine the scene type according to the depth distribution and the confidence coefficient distribution.

The depth distribution is configured to indicate a proportion of pixel units in each depth interval, and the confidence coefficient distribution is configured to indicate a proportion of pixel units in each confidence interval.

In embodiments of the present disclosure, after determining the depth and the confidence coefficient of the depth corresponding to each pixel unit in the region of interest, the scene type is determined according to the depth and the confidence coefficient of the depth corresponding to each pixel unit in the region of interest.

As a possible implementation, the correspondence relation between different depths and confidence coefficients of depths and the scene types may be set in advance. Therefore, in the present disclosure, after determining the depth and the confidence coefficient of the depth corresponding to each pixel unit in the region of interest, the scene type may be determined by querying the above correspondence relation according to the depth and the confidence coefficient of the depth.

As an example, the scene type is classified according to the distance from the background to the foreground in the first image and the distance from the background to the TOF camera. When the distance from the background to the TOF camera is far, for example, greater than the first threshold, it is determined that the scene type is scene type one. When the distance between the background and the foreground is close, for example, less than the second threshold, it is determined that the scene type is scene type two. When the distance between the background and the foreground is far, for example, greater than the second threshold and less than a third threshold, the scene type is determined as scene type three. In this way, the corresponding relation between the distance and the scene type is established. Therefore, in the present disclosure, after determining the depth and the confidence coefficient of the depth corresponding to each pixel unit in the region of interest, the distance from the background to the foreground and the distance from the background to the TOF camera may be determined according to the depth and the confidence coefficient of the depth corresponding to each pixel unit in the region of interest. According to the determined result, the scene type to which the region of interest belongs may be determined by querying the above-mentioned correspondence relation.

As another possible implementation, statistics may be separately performed on the depths corresponding to respective pixel units in the region of interest and the confidence coefficients of depths corresponding to respective pixel units in the region of interest, to obtain the depth distribution and the confidence coefficient distribution, so that the scene type may be determined according to the depth distribution and the confidence coefficient distribution.

In embodiments of the present disclosure, after identifying the region of interest from the second image, and after determining the depth the confidence coefficient of the depth corresponding to each pixel unit in the region of interest according to the first image, statistics analysis may be performed on respective pixel units in the first image to obtain the depth distribution and the confidence coefficient distribution.

As a possible implementation, statistical analysis is performed on respective pixel units in the first image to obtain the depth distribution. In detail, for the obtained first image, depth intervals are set in advance, and then the number of the pixel units in each depth interval in the first image are counted. The ratio of the number of pixel units in each depth interval to the total number of pixel units in the first image is calculated, the proportion of pixel units in each depth interval is obtained, and further the depth distribution is obtained. Thus, the depth distribution of the scene within the effective measurement range can be determined.

As another possible implementation, statistical analysis is performed on pixel units in the first image to obtain the confidence coefficient distribution. In detail, for the obtained first image, confidence intervals are set in advance, and the number of pixel units whose depth belongs to the corresponding confidence interval is counted, the ratio of the number of the pixel units to the total number of pixel units in the first image is calculated, and a proportion of the pixel units in the corresponding confidence interval is obtained, thereby obtaining the confidence coefficient distribution.

In embodiments of the present disclosure, the second determining unit 123 may be further configured to, in response to determining that a background beyond the measurement range is present in the region of interest according to the confidence coefficient distribution, determine the scene type as a first scene type; and in response to determining that there is no background beyond the measurement range in the region of interest according to the confidence coefficient distribution, determine a distance level between the background and a foreground in the region of interest according to the depth distribution, and determining the scene type as a second scene type or a third scene type according to the distance level, in which the distance between the background and the foreground in the scene of the second scene type is greater than the distance between the background and the foreground in the scene of the third scene type.

It should be noted that the closer the background is to the TOF camera, the larger the confidence coefficient of the depth is, and the farther the background is to the TOF camera, the smaller the confidence coefficient of the depth is. Therefore, in this embodiment of the present disclosure, whether a background beyond the measurement range exists in the region of interest may be determined according to the confidence coefficient distribution corresponding to respective pixel units in the region of interest.

As a possible implementation, it may be determined whether there is a pixel unit with a confidence coefficient less than the first confidence threshold in the region of interest. If yes, then it is determined that there is a background beyond the measurement range in the region of interest, otherwise, there is no background beyond the measurement range in the region of interest.

The first confidence threshold may be determined in advance according to the measurable range. For example, the measurable range corresponding to closeup shooting may be determined in advance, so that the first confidence threshold may be determined based on the measurable range. Alternatively, the measurable range corresponding to distant shooting may be determined in advance, so that the first confidence threshold is determined according to the measurable range. When the user captures an image, it may be determined whether the shooting is close shooting or distant shooting according to the user's operation, so that the corresponding first confidence threshold may be determined.

It should be noted that, there may be abnormal points or interference points in the region of interest, or only a small background region exists in the region of interest, for example, only a small corner exists in the region of interest. Therefore, if there are only a few or a small number of pixel units whose confidence coefficient of the depth is less than the confidence threshold in the second image, it is obviously unreasonable to determine that there is a background beyond the measurement range in the region of interest.

Therefore, as another possible implementation, in order to improve the accuracy of the determination result, the number of pixel units in the region of interest whose corresponding confidence coefficient is less than the confidence threshold may be counted to obtain the first number, the ratio of the first number to the total number of pixels in the region of interest is determined to obtain a first ratio, and it is determined whether the first ratio is greater than the first threshold. If the ratio is greater than the first threshold, it is determined that there is a background beyond the measurement range in the region of interest, otherwise, it is determined that there is no background beyond the measurement range in the region of interest. The first ratio is preset, for example, the first ratio may be 10%.

In the present disclosure, the scene type to which the region of interest belongs is determined as the first scene type, in response to determining that the background beyond the measurement range is present in the region of interest, that is, the background is far.

In embodiments of the present disclosure, in response to determining that there is no background beyond the measurement range, the distance level between the background and the foreground in the region of interest may be determined according to the depth distribution corresponding to respective pixel units in the region of interest.

As a possible implementation, a maximum depth and a minimum depth may be determined according to the depth distribution of respective pixel units in the region of interest, and the distance level between the background and foreground in the region of interest is determined according to the ratio or difference between the maximum depth and the minimum depth.

It should be noted that there may be abnormal points and interference points in the region of interest, resulting in that the confidence coefficient of the depth of the corresponding pixel unit is relatively small (away from the camera), and it is obviously unreasonable that the depth corresponding to such pixel unit is used as the maximum depth. Therefore, as another possible implementation, in order to improve the accuracy of the determination result, target depths whose confidence coefficient is greater than the second confidence threshold may be selected from the depths corresponding to respective pixel units for the region of interest, and the maximum depth and the minimum depth are determined in the target depths, so that the distance level between the background and the foreground in the region of interest may be determined according to the ratio or difference between the maximum depth and the minimum depth. The second confidence threshold is predetermined.

For example, it is determined that, the larger the ratio between the maximum depth and the minimum depth, or the larger the difference between the maximum depth and the minimum depth, the larger the distance level, and the smaller the ratio between the maximum depth and the minimum depth, or the smaller the difference between the maximum depth and the minimum depth, the smaller the distance level. The larger the distance level, the farther the distance between the foreground and the background, and the smaller the distance level, the closer the distance between the foreground and the background.

In embodiments of the present disclosure, after the distance level is determined, it is possible to determine whether the region of interest belongs to the second scene type or the third scene type according to the distance level. The distance between the background and the foreground in the second scene type is greater than the distance between the background and the foreground in the third scene type.

As a possible implementation, a correspondence relation between the distance level and the scene type may be established in advance. In the present disclosure, after the distance level is determined, the foregoing correspondence relation may be queried to determine the scene type to which the region of interest belongs.

As another implementation, the depth image processing apparatus may further include a determining module 140.

The determining module 140 is configured to determine the scene type as the first scene type or the second scene type.

As another possible implementation, the processing module 130 further includes a determining unit 131 and a deleting unit 132.

The determining unit 131 is configured to determine a corresponding target confidence threshold according to the scene type.

In embodiments of the present disclosure, when the determined scene type is different, the corresponding threshold determination strategy may be determined according to the scene type, so that the confidence coefficients of respective pixel units in the first image may be processed according to the threshold determination strategy, to obtain the target confidence threshold.

In a possible case, when the scene type is determined to be the first scene type, the pixel units can be sorted according to the confidence coefficients corresponding to respective pixel units in the region of interest from large to small, so as to obtain a plurality of pixel units ranked at the top. Furthermore, the target confidence threshold is determined according to the median value of the confidence coefficients corresponding to the plurality of pixel units.

In embodiments of the present disclosure, for the region of interest, the confidence coefficients of all pixel units in the region of interest may be arranged in order according to the confidence coefficient, for example, according to the confidence coefficients from large to small, to obtain the plurality of pixel units ranked at the top.

It should be noted that the number of the plurality of pixel units may be a product of the total number of pixel units included in the region of interest and a fixed ratio, in which 0<fixed ratio≤1. The fixed ratio may be set in advance by a built-in program of the electronic device, or may be set by a user, which is not limited. For example, the fixed ratio may be 10%.

In addition, the number of the plurality of pixel units may also have a positive relation with the total number of pixel units included in the region of interest, that is, the number of the plurality of pixel units may increase as the increasing of the total number of pixel units included in the region of interest, or the number of the plurality of pixel units may decrease as the decreasing of the total number of pixel units included in the region of interest.

In embodiments of the present disclosure, after determining the plurality of pixel units ranked at the top, for example, the number of the plurality of pixel units is marked as N. If N is an odd number, the median value of the confidence coefficients corresponding to the plurality of pixel units may be the confidence coefficient of the depth corresponding to the pixel unit at the (N+1)/2th position in the sequence. If N is an even number, the median value of the confidence coefficients of the plurality of pixel units may be the confidence coefficient of the depth corresponding to the pixel unit at the N/2th position in the sequence, or the confidence coefficient of the depth corresponding to the pixel unit at the (N/2+1)th position in the sequence, or the mean value of the confidence coefficient of the depth corresponding to the pixel unit at the N/2th position in the sequence and the confidence coefficient of the depth corresponding to the pixel unit at the (N/2+1)th position. After determining the median value of the confidence coefficients corresponding to the plurality of pixel units, the median value may be used as the target confidence threshold.

In another possible case, when the scene type is determined as the second scene type, respective pixel units in the first image may be divided into a first portion and a second portion, and a confidence coefficient variance between the first portion and the second portion is the largest. The confidence coefficient of the depth corresponding to the pixel unit in the first portion is greater than the confidence coefficient of the depth corresponding to the pixel unit in the second portion. Furthermore, the target confidence threshold is determined according to the confidence coefficients of the depths corresponding to respective pixel units in the first portion.

The deleting unit 132 is configured to delete the depth of the pixel unit in the first image whose confidence coefficient is less than the target confidence threshold.

In embodiments of the present disclosure, after the corresponding target confidence threshold is determined according to the scene type, the confidence coefficient of the depth corresponding to each pixel unit in the first image may be compared with the target confidence threshold, and the depth of the pixel unit whose confidence coefficient is less than the target confidence threshold may be deleted. Therefore, a high-quality depth image may be output, and abnormal points in the depth image, such as fly pixel points, may be effectively removed to improve the smoothness of the depth image.

As another possible implementation, the determining unit 131 is further configured to determine the corresponding threshold determination strategy according to the scene type; and process the confidence coefficient of each pixel unit in the first image according to the threshold determination strategy, to obtain the target confidence threshold.

As another possible implementation, the depth image processing apparatus may further include an adjusting module 150.

The adjusting module 150 is configured to adjust operating parameters of the depth sensor according to the scene type.

The depth sensor is a TOF camera, and the operating parameters include the power and frequency of the infrared light emitted by the TOF. The frequency of the infrared light includes a single frequency and a dual frequency. The adjusting module 150 is further configured to query the operating parameter table according to the scene type, to obtain the corresponding frequency and power, and adjust the depth sensor to the queried frequency and power.

The operating parameter table may be obtained according to an experimental test, and may also be calculated according to TOF hardware parameters. Certainly, it may also be generated by other methods, which is not limited in this embodiment.

As a possible implementation, the correspondence relation between the operating parameters of the depth sensor and the scene type may be stored in the operating parameter table in advance. Therefore, in this embodiment, after determining the scene type, the foregoing operating parameter table may be queried to obtain frequency and power corresponding to the scene type.

For example, the correspondence relation between the operating parameters of the depth sensor and the scene type stored in the operating parameter table is as follows. The first scene type corresponds to dual frequency and high power, the second scene type corresponds to single frequency or dual frequency and medium power, and the third scene type corresponds to single frequency and low power. In this example, in response to determining that the scene type is the third scene type, at this time, the background is relatively close, and the depth sensor may be adjusted to emit infrared light with single frequency and low power.

It should be noted that, in this embodiment, when the depth sensor collects the first image, the frequency of the infrared light emitted includes two cases: single frequency and dual frequency. For example, the depth sensor may emit light of any one of two frequencies of 40 Hz and 60 Hz, and may also emit light at two frequencies of 40 Hz and 60 Hz at the same time.

In embodiments of the present disclosure, after querying the operating parameter table according to the scene type to obtain the corresponding frequency and power, the adjusting module 150 is configured to adjust the operating parameters of the depth sensor to the queried frequency and power.

It should be noted that the foregoing explanation of the embodiments of the depth image processing method is also applicable for the depth image processing apparatus according to this embodiment, and details are not described herein again.

With the depth image processing apparatus according to embodiments of the present disclosure, the first image acquired by the depth sensor and the second image acquired by the image sensor are acquired, the scene type is determined according to the first image and the second image, and the filtering process is performed on the first image according to the scene type. Therefore, filtering process may be performed adaptively on the depth image by selecting a filtering mode according to different scene type, to output a high-quality depth image, thereby improving the quality of the depth image.

In order to implement the above embodiments, the present disclosure also provides an electronic device. The electronic device includes a memory, a processor, and a computer program stored in the memory and executable on the processor. When the program is executed by the processor, the depth image processing method according to the above embodiments is implemented.

In order to implement the above embodiments, the present disclosure also provides a computer-readable storage medium on which a computer program is stored, and when the program is executed by a processor, the depth image processing method according to the foregoing embodiment of the disclosure is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for depth image processing, comprising:
    acquiring a first image acquired by a depth sensor and a second image acquired by an image sensor;
    identifying a region of interest from the second image;
    determining a depth and a confidence coefficient of the depth corresponding to each pixel unit in the region of interest according to the first image;
    determining a scene type according to the depth and the confidence coefficient of the depth corresponding to each pixel unit in the region of interest; and
    performing a filtering process on the first image according to the scene type,
    wherein determining the scene type according to the depth and the confidence coefficient of the depth corresponding to each pixel unit in the region of interest, comprises:
        performing statistical analysis on the depths corresponding to respective pixel units in the region of interest to obtain a depth distribution;
        performing statistical analysis on the confidence coefficients to obtain a confidence coefficient distribution; and
        determining the scene type according to the depth distribution and the confidence coefficient distribution,
    wherein the depth distribution is configured to indicate a proportion of pixel units in each depth interval, and the confidence coefficient distribution is configured to indicate a proportion of pixel units in each confidence interval.

2. The method according to claim 1, wherein determining the scene type according to the depth distribution and the confidence coefficient distribution, comprises:
    in response to determining that a background beyond a measurement range is present in the region of interest according to the confidence coefficient distribution, determining the scene type as a first scene type; and
    in response to determining according to the confidence coefficient distribution that there is no background beyond the measurement range in the region of interest, determining a distance level between the background and a foreground in the region of interest according to the depth distribution, and determining the scene type as a second scene type or a third scene type according to the distance level, wherein the distance between the background and the foreground in the second scene type is greater than the distance between the background and the foreground in the third scene type.

3. The method according to claim 2, wherein determining the distance level between the background and a foreground in the region of interest according to the depth distribution, comprises:
    determining a maximum depth and a minimum depth according to the depth distribution; and
    determining the distance level according to a ratio or a difference between the maximum depth and the minimum depth.

4. The method according to claim 1, wherein performing the filtering process on the first image according to the scene type, comprises:

determining a target confidence threshold according to the scene type; and
deleting the depth of a pixel unit in the first image having a confidence coefficient lower than the target confidence threshold.

5. The method according to claim 4, wherein determining the target confidence threshold according to the scene type, comprises:
determining a threshold determination strategy according to the scene type; and
processing the confidence coefficient of each pixel unit in the first image according to the threshold determination strategy to obtain the target confidence threshold.

6. The method according to claim 1, further comprising:
adjusting operating parameters of a depth sensor according to the scene type.

7. The method according to claim 6, wherein the depth sensor is a time-of-flight (TOF) camera, and the operating parameters comprise a power of infrared light emitted by the TOF camera and a frequency of the infrared light; and wherein
adjusting the operating parameters of the depth sensor according to the scene type, comprises:
querying an operating parameter table according to the scene type to obtain corresponding frequency and power; and
adjusting the operating parameters of the depth sensor to the queried frequency and power.

8. A depth image processing apparatus, comprising:
a processor; and
a memory, configured to store instructions executable by the processor,
wherein the processor is configured to run a program corresponding to the instructions by reading the instructions stored in the memory, so as to:
acquire a first image acquired by a depth sensor and a second image acquired by an image sensor;
identify a region of interest from the second image;
determine a depth and a confidence coefficient of the depth corresponding to each pixel unit in the region of interest according to the first image;
determine a scene type according to the depth and the confidence coefficient of the depth corresponding to each pixel unit in the region of interest;
perform a filtering process on the first image according to the scene type;
perform statistical analysis on the depths corresponding to respective pixel units in the region of interest to obtain a depth distribution;
perform statistical analysis on the confidence coefficients to obtain a confidence coefficient distribution; and
determine the scene type according to the depth distribution and the confidence coefficient distribution,
wherein the depth distribution is configured to indicate a proportion of pixel units in each depth interval, and the confidence coefficient distribution is configured to indicate a proportion of pixel units in each confidence interval.

9. The apparatus according to claim 8, wherein the processor is configured to:
in response to determining that a background beyond a measurement range is present in the region of interest according to the confidence coefficient distribution, determine the scene type as a first scene type; and
in response to determining according to the confidence coefficient distribution that there is no background beyond the measurement range in the region of interest, determine a distance level between the background and a foreground in the region of interest according to the depth distribution, and determine the scene type as a second scene type or a third scene type according to the distance level, wherein the distance between the background and the foreground in the second scene type is greater than the distance between the background and the foreground in the third scene type.

10. The apparatus according to claim 9, wherein the processor is configured to:
determine a maximum depth and a minimum depth according to the depth distribution; and
determine the distance level according to a ratio or a difference between the maximum depth and the minimum depth.

11. The apparatus according to claim 8, wherein the processor is configured to:
determine a target confidence threshold according to the scene type; and
delete the depth of a pixel unit in the first image having a confidence coefficient lower than the target confidence threshold.

12. The apparatus according to claim 11, wherein the processor is configured to:
determine a threshold determination strategy according to the scene type; and
process the confidence coefficient of each pixel unit in the first image according to the threshold determination strategy to obtain the target confidence threshold.

13. The apparatus according to claim 8, wherein the processor is further configured to:
adjust operating parameters of a depth sensor according to the scene type.

14. The apparatus according to claim 13, wherein the depth sensor is a time-of-flight (TOF) camera, and the operating parameters comprise a power of infrared light emitted by the TOF camera and a frequency of the infrared light; and
the processor is configured to:
query an operating parameter table according to the scene type to obtain corresponding frequency and power; and
adjust the operating parameters of the depth sensor to the queried frequency and power.

15. An electronic device, comprising:
a depth sensor, configured to acquire a first image;
an image sensor, configured to acquire a second image synchronously with the first image; and
a processor, configured to acquire the first image and the second image, to identify a region of interest from the second image, to determine a depth and a confidence coefficient of the depth corresponding to each pixel unit in the region of interest according to the first image, to determine a scene type according to the depth and the confidence coefficient of the depth corresponding to each pixel unit in the region of interest, to perform a filtering process on the first image according to the scene type, to perform statistical analysis on the depths corresponding to respective pixel units in the region of interest to obtain a depth distribution, to perform statistical analysis on the confidence coefficients to obtain a confidence coefficient distribution, and to determine the scene type according to the depth distribution and the confidence coefficient distribution, wherein the depth distribution is configured to indicate a proportion of pixel units in each depth interval, and the confidence coefficient distribution is configured to indicate a proportion of pixel units in each confidence interval.

16. The electronic device according to claim 15, wherein the processor is further configured to adjust operating parameters of the depth sensor according to the scene type.

* * * * *